Sept. 13, 1966       G. E. PARKER       3,272,234
MAGNETICALLY CONTROLLED VALVE
Filed May 13, 1964       2 Sheets-Sheet 2
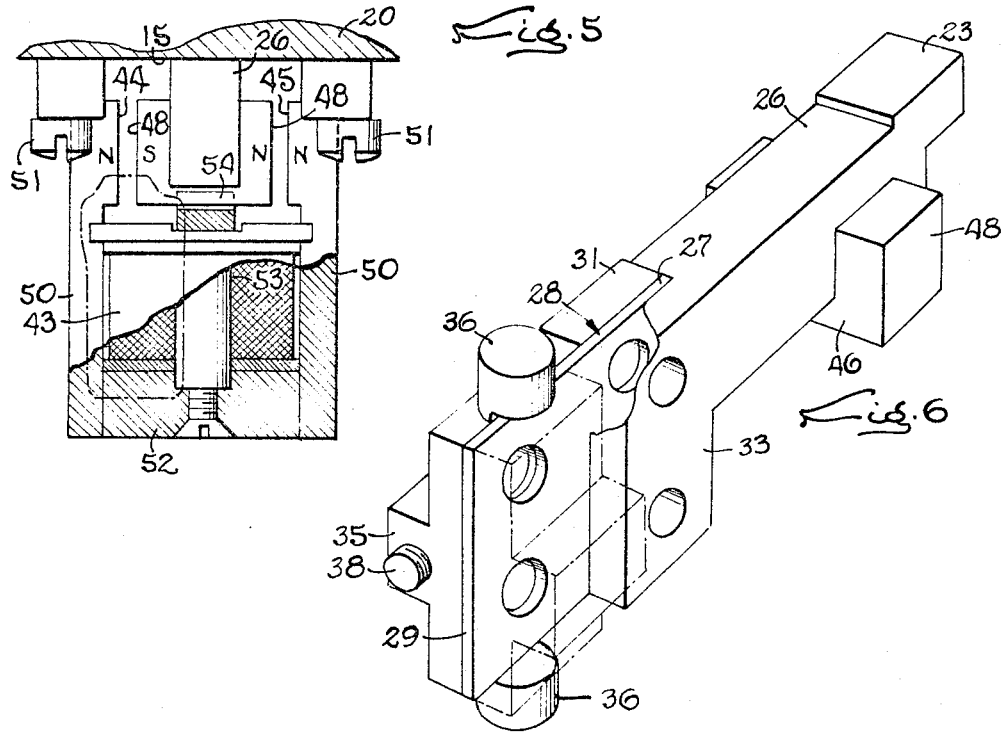
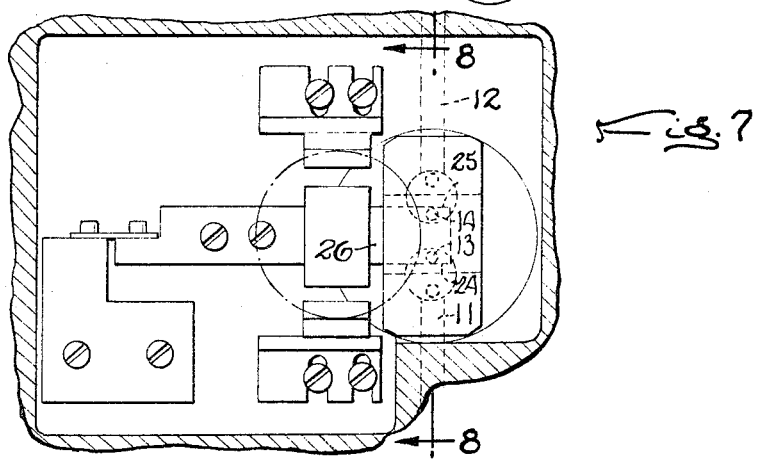
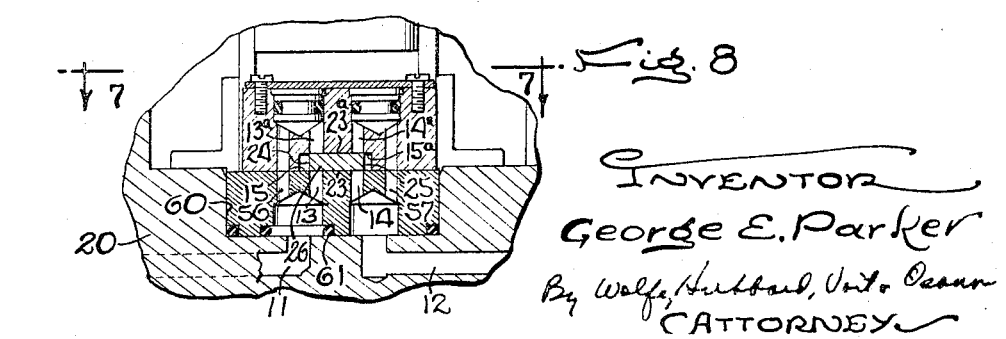
INVENTOR
George E. Parker
By Wolfe, Hubbard, Voit & Osann
ATTORNEY

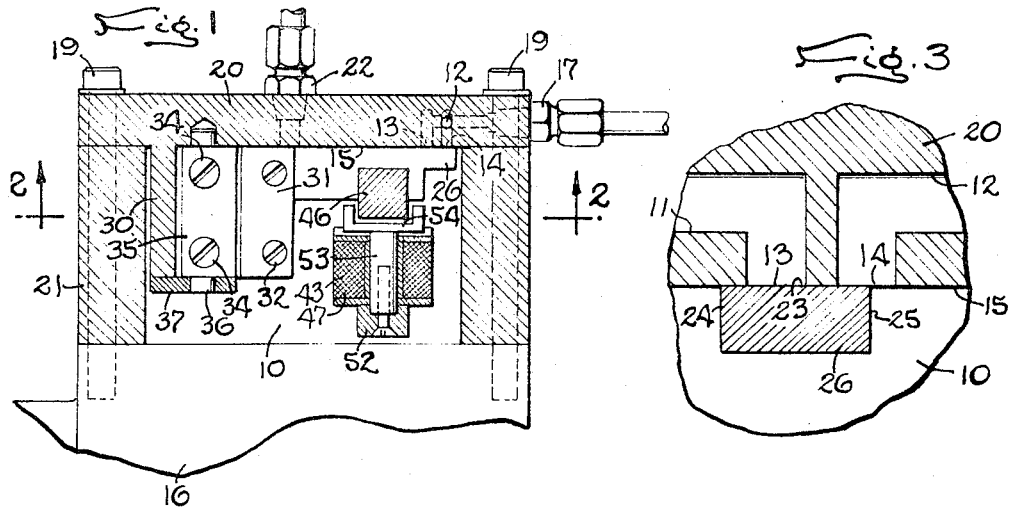

United States Patent Office

3,272,234
Patented Sept. 13, 1966

3,272,234
MAGNETICALLY CONTROLLED VALVE
George E. Parker, Rockford, Ill., assignor to Woodward Governor Company, Rockford, Ill., a corporation of Illinois
Filed May 13, 1964, Ser. No. 367,110
7 Claims. (Cl. 137—625.65)

This invention relates to valves of the type in which the flow of fluid into and out of a pressure chamber is controlled by a member which covers two ports when in a centered or valve closed position and is slidable transversely of the ports and in opposite directions away from such position to uncover one of the ports and connect the same to a surrounding chamber.

The primary object is to provide a valve of the above character in which the movable member is supported in a novel manner so as to be free of rubbing friction.

A more detailed object is to mount the movable valve member on the free end of a leaf spring which is bendable laterally to permit movement of the member transversely of the parts while holding the member in close proximity to, for example less than .001 of an inch, but out of rubbing contact with the surface defining the two parts.

Another object is to provide for actuation of the valve in a novel manner by a sensitive electromagnet.

A further object is to maintain the leaf spring stressed in the same direction in all positions of the valve member and thus avoid a dead-band as an incident to movement thereof in opposite directions away from a centered position.

Still another object is to provide for balancing of the pressures exerted on the valve member in directions edgewise of the leaf spring.

Other objects and advantages of the invention will become apparent from the following detailed description taken in connection with the accompanying drawings in which FIGURE 1 is a fragmentary vertical section of a magnetically controlled valve embodying the novel features of the present invention, the section being taken along the line 1—1 of FIG. 2.

FIG. 2 is a section taken along the line 2—2 of FIG. 1.

FIG. 3 is a fragmentary section taken along the line 3—3 of FIG. 2.

FIG. 4 is an enlargement of a part of FIG. 3.

FIG. 5 is a fragmentary section taken along the line 5—5 of FIG. 2.

FIG. 6 is a fragmentary perspective view of the valve member and its mounting.

FIG. 7 is a view similar to FIG. 2 showing a modified form of the valve, the section being on the line 7—7 of FIG. 8.

FIG. 8 is a fragmentary section taken along the line 8—8 of FIG. 7.

In the exemplary form shown in the drawings, the improved valve controls communication between a pressure chamber 10 and either of two passages 11 and 12 containing fluid at relatively high and low pressures and terminating in ports 13 and 14 opening inwardly through a wall 15 of a casing which defines the chamber 10. Herein, the casing comprises a generally flat base 16 through which the passages 11 and 12 are extended from fittings 17 and 18 and an inverted box-like cover clamped and sealed against the base by screws 19 and having a top 20 and sides 21. Through an outlet fitting 22 on the cover, pressure changes in the chamber are transmitted to a fluid servo or other device to be actuated.

While the ports 13 and 14 may be in opposed parallel walls of the pressure chamber, they are, in the form shown in FIGS. 1 to 6, spaced apart laterally and disposed in a common plane defined by the flat wall 15 which is the top surface of the chamber. Herein, the ports are circular in shape and cooperate with the opposed flat surface 23 and edges 24 and 25 on one end of a member 26 of non-magnetic material movable back and forth transversely of the ports and mounted to maintain the surfaces 15 and 23 in close proximity but out of actual rubbing contact with each other in all positions of the member, the spacing being about .0005 of an inch in the present instance. This is accomplished by securing the other end of the member to the free end portion 27 of a leaf spring 28 disposed in a plane perpendicular to the surfaces 15 and 23 with its opposite end portion 29 anchored cantilever fashion in a post 30 rigid with and depending from the top wall 20.

The leaf spring is a relatively wide and flat strip of spring steel about .010 of an inch thick with its free end portion 27 clamped by a plate 31 and screws 32 against the short leg 33 of the member 26 which is L-shaped in the present instance. The other end portion 29 is clamped by screws 34 between two blocks 35, one of which is formed at opposite ends with trunnions 36 received in holes in the wall 20 and a plate 37 clamped to the lower end of the post 30. The end of the spring is thus pivotally supported but after adjustment, as later described, is anchored to the post by screws 38 threading through the plates and abutting against the post 30. The short unsupported length of the leaf between the plates 31 and 35 provides for movement of the valve surface 23 back and forth across the ports 13, 14.

With the leaf disposed in a plane perpendicular to the valve ports, pressure on the surface 23 of fluid from the high pressure port will be applied to the leaf in an edgewise direction. But owing to its substantial width, the leaf is adapted to withstand substantial stressing without distortion and thus maintain the desired close spacing (.0005 of an inch) between the surface 23 and the surface 15 defining the valve ports. Rubbing friction is thus eliminated and the valve member 26 is freely movable across the ports 13, 14 both of which are fully covered when the surface 23 is in a centered position shown in FIG. 2, the chamber 10 then being disconnected from both ports except for the extremely narrow gap above described. Shifting of the member off-center as shown in FIG. 3 will connect the chamber to the port 14 while movement off-center in the opposite direction will expose the port 13.

To avoid a dead-band in the operation of the valve in response to opposite changes in the control force exerted on the member, provision is made for maintaining the stress in the leaf spring of the same character throughout the full range of movement of the valve member. While this may be accomplished by various arrangements of springs, it is achieved in the present instance through a light compression spring coil 40 extending transversely of the valve member 26 and having one end supported in a block 41 secured to the wall 15. The opposite end of the coil is compressed under relatively light pressure against one side of the member 26 so as to urge the latter in one direction out of centered position as shown in FIG. 4. Then by adjusting the screws 38, the leaf spring is bent reversely to develop a force which just balances that of the coiled spring when the valve member has been returned to the centered position (FIG. 2) and fully covering both ports. The leaf spring thus remains stressed in the same way in opposite movements of the member out of the centered position during which the bending stress in the spring increases and decreases but is never reversed.

In accordance with the present invention, control forces for shifting the valve member are developed by a magnet 43 having pole faces 44, 45 which coact with an armature 46 on the valve member to exert oppositely directed forces in response to opposite energization of the winding 47 of the magnet, these forces being in directions paralleling the plane of the valve ports and perpendicular to the leaf spring. Herein, the valve member 26 is composed of non-magnetic material such as aluminum and the armature comprises a U-shaped block of permanent magnet material straddling and bonded to the member so as to present opposite parallel ends 48 disposed opposite the pole faces 44, 45. The block is magnetized to oppositely polarize the ends 48.

The pole faces 44, 45 are on the upper ends of the parallel plates 50 of magnetic material clamped by screws 51 against the top wall 15 and spanned at their lower ends by a block 52. Extending upwardly from the center of the latter is a post 53 whose U-shaped upper end 54 constitutes one pole of the magnet core which is E-shaped in cross-section, the pole 54 being disposed adjacent and beneath the flat bottom surface of the armature 46. The winding 43 surrounds the post 53 between the plates 50. With this arrangement, a flow of current in one direction through the winding in one direction will provide one polarity at the faces 44, 45 and the opposite polarity at the pole 54. Thus, with the parts polarized as indicated in FIG. 5, the armature 46 will be attracted by the pole 44 and repelled by the pole 45 so as to develop a force biasing the armature to the left as viewed in FIG. 5 and moving the same to uncover an area of the port 14 corresponding to the magnitude of the energizing current. Conversely, a current flowing in the opposite direction in the coil will reverse the polarities at the poles 44, 45 and 54 and bias the valve member in the opposite direction to uncover part or all of the port 13.

If desired, provision may be made to balance the forces exerted by the high pressure fluid on the valve member 26. This may be accomplished as shown in FIGS. 7 and 8 by forming the member with two surfaces 23 and 23a and edges 24 and 25 disposed on opposite sides of the member and coacting with pairs of ports 13, 14 and 13a, 14a in flat surfaces 15 and 15a. To this end, the high and low pressure passages 11 and 12 are extended not only to the ports 13, 14 but also to the ports 13a, 14a through passages 56, 57 formed in blocks held in face to face contact by suitable screw clamps with the assembly sealed into a recess 60 in the casing wall 20. A suitable seal 61 encloses the end of the high pressure passage 11.

I claim as my invention:

1. A valve construction having, in combination, a leaf spring of substantial width fixedly anchored at one end cantilever fashion, a valve member projecting from and supported by the free end of said spring for movement in a plane accurately defined by flexing of the spring and in opposite directions away from and toward a predetermined centered position, said member having a side surface paralleling said plane and terminating in an edge facing in one direction along the plane and a second surface paralleling said plane and terminating in a second edge laterally spaced from said first edge and facing in a direction opposite to the first edge, sources of relatively high and low pressures, means defining a passage communicating with said low pressure source and terminating in a first stationary port disposed opposite and closely adjacent said first surface but out of rubbing contact therewith, said port being covered by said first surface when said member is disposed in said centered position or to one side thereof, but opened progressively in the movement of the member in one direction away from such position, means defining a passage communicating with said high pressure source and terminating in a second port laterally spaced from said first port and disposed opposite and closely adjacent but out of rubbing contact with said second surface so as to be covered when said member is in said centered position and opened progressively in the movement of the member in the opposite direction away from such position, a fluid filled pressure chamber enclosing said member and said ports, and means for moving said member in said plane by flexing of said leaf spring and thereby admitting pressure fluid to said chamber through said second port or releasing fluid from the chamber through said first port.

2. A valve construction as defined in claim 1 in which said ports are disposed side by side in one wall of a fluid tight chamber enclosing said member and said leaf spring.

3. A valve construction as defined in claim 1 in which the spacing maintained by said leaf spring between said member and said ports is less than .001 of an inch.

4. A valve construction as defined in claim 1 in which said ports are located on one side of said valve member and including similar ports and edges located on the opposite side of the member whereby the pressures exerted on said member transversely of said plane act in opposite directions and substantially balance each other.

5. A valve as defined in claim 1 including spring means continuously biasing said valve member in one direction to flex said leaf spring and maintain the same under a bending stress in all positions of the member, the magnitude of such stress increasing and decreasing with the opposite movements of the member.

6. A valve as defined in claim 1 including a magnet selectively energizable in opposite directions to exert on said valve member forces biasing the member in corresponding directions to move the member in said plane as permitted by flexing of said leaf spring.

7. A valve as defined in claim 6 including an armature on said valve member permanently polarized and having pole faces of opposite polarity facing in opposite directions along said plane, said magnet comprising a winding and an associated core providing pole faces coacting with the faces of said armature to bias the latter in opposite directions in response to opposite current flows in said winding.

References Cited by the Examiner

UNITED STATES PATENTS

| | | | |
|---|---|---|---|
| 2,603,192 | 7/1952 | Kensok | 137—625.68 |
| 2,745,434 | 5/1956 | Stevenson | 251—283 X |
| 2,858,849 | 11/1958 | Griffith | 91—459 X |
| 2,893,427 | 7/1959 | Felgate | 137—625.65 X |
| 2,959,189 | 11/1960 | Natho | 137—625.65 |
| 3,090,400 | 5/1963 | Broome | 137—625.43 X |

M. CARY NELSON, *Primary Examiner.*

H. KLINKSIEK, *Examiner.*